A. CARREIRO.
CLEARER ATTACHMENT FOR VEHICLES.
APPLICATION FILED MAY 13, 1913.
1,089,322.
Patented Mar. 3, 1914.
2 SHEETS—SHEET 2.
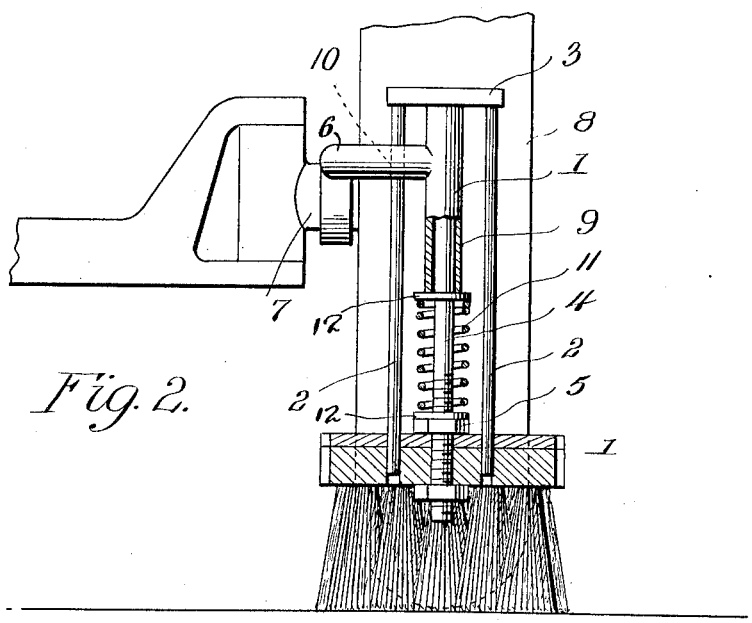
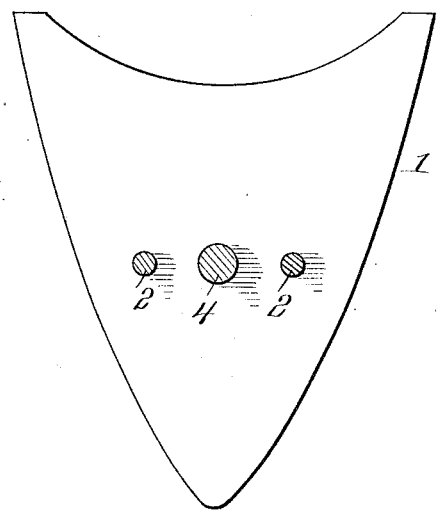

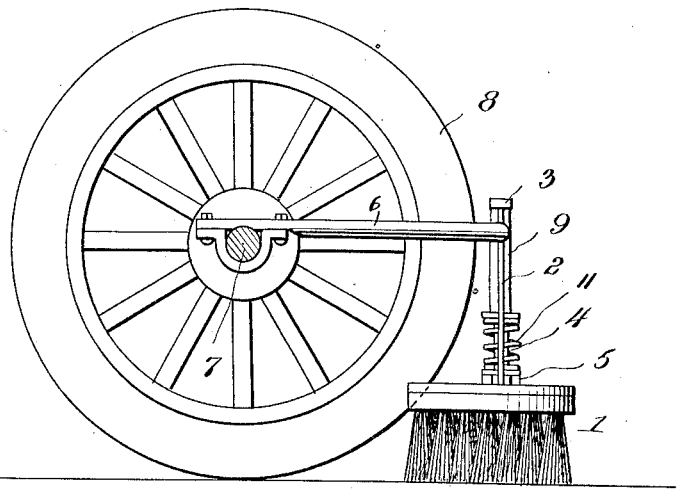
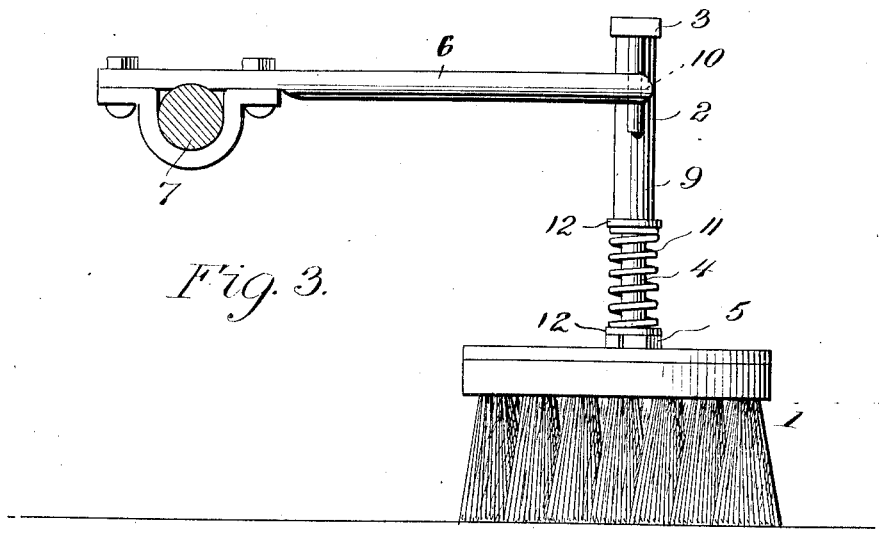

UNITED STATES PATENT OFFICE.

ANGELO CARREIRO, OF FALL RIVER, MASSACHUSETTS.

CLEARER ATTACHMENT FOR VEHICLES.

1,089,322. Specification of Letters Patent. Patented Mar. 3, 1914.

Application filed May 13, 1913. Serial No. 767,315.

*To all whom it may concern:*

Be it known that I, ANGELO CARREIRO, a citizen of Portugal, a republic, residing at Fall River, in the county of Bristol and State of Massachusetts, have invented new and useful Improvements in Clearer Attachments for Vehicles, of which the following is a specification.

In the operation of vehicles equipped with pneumatic tires considerable annoyance is experienced by puncture occasioned by the tire passing over sharp objects such as tacks, broken glass, broken pieces of stone and the like.

The present invention provides means arranged to operate in advance of the wheels of a vehicle equipped with pneumatic tires so as to remove obstructing matter from the path of such wheels, thereby preventing injury to the pneumatic tires, with the result that the life of such tires is prolonged and greater comfort is experienced in riding any vehicles whose wheels are equipped with pneumatic tires.

The invention consists of a clearer arranged to operate in advance of the wheel of a vehicle, said clearer being supported from the axle in a manner to adapt itself to the vibratory movement of the wheel incident to the yielding of the tire.

The invention further has for its object the provision of simple and effective means between the clearer and supporting part, said connecting means including a spring or like part arranged to hold the clearer in engagement with the surface over which the vehicle wheel travels.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a view in elevation of a vehicle wheel and clearer therefor embodying the invention. Fig. 2 is a front view of the parts illustrated in Fig. 1. Fig. 3 is a detail view, showing more clearly the connecting means between the clearer supporting arm and the axle arm or spindle. Fig. 4 is an enlarged sectional view of the clearer and connecting parts.

Corresponding and like parts are referred to in the following description, and indicated in all the views of the drawings, by the same reference characters.

The clearer is indicated by the numeral 1 and may be of any construction and preferably consists of a brush having a tapered form so that when in operation it will engage with and push objects to one side of the path of the wheel and thereby prevent injury to the tire. The rear portion of the brush is made concave to admit of the clearer coming close to the tire of the wheel which is of advantage in insuring effective clearing of the path in advance of the vehicle wheel. The clearer is arranged in front of the wheel with its bristles or brush part in contact with the surface, thereby insuring a clearing of the same of objects which would tend to injure the tire. Guide rods 2 project vertically from the clearer 1 or back of the brush and are connected at their upper ends by means of a cross piece 3. A main rod 4 projects vertically from the clearer and is arranged between the guide rods 2 and parallel therewith, said main rod being secured at its lower end to the clearer and being jointed at its upper end to the cross piece 3. The lower portion of the main rod is threaded and receives nuts 5 between which the clearer or back of the brush is clamped.

An arm, or rod, or bar 6 is adapted to be secured in any manner to the spindle or axle arm 7 upon which the wheel 8 is mounted. This arm 6 has a portion extending along one side of the wheel 8 and a portion bent to project in front of such wheel. A tube or sleeve 9 is secured to the bent end of the arm or rod 6 and is mounted upon the main rod 4. The bent portion of the arm near the tube or sleeve 9 is formed with a vertical opening 10 through which one of the guide rods 2 passes, thereby holding the clearer in proper position. A helical spring 11 of the expansible type is mounted upon the lower portion of the main rod 4 and exerts a downward pressure upon the clearer to hold the same in contact with the surface. Washers 12 are mounted upon the main rod 4 and are located at the ends of the helical spring 11 so as to receive the end thrust thereof. The arm 6 occupies a fixed relative position. The elevation of the clearer 1 may be adjusted by means of the nuts 5, whereby provision is had for taking up wear so that the clearer may be lowered when the bristles or brush material become worn.

The accompanying drawings illustrate the application of the invention to the steering wheel of a vehicle such as an automobile so that the clearer may always occupy a position in advance of the wheel no matter what may be the relative angular position thereof. When adapting the invention to the rear wheels of the vehicle it is to be understood that it may be connected to any convenient part of the axle.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In means of the character specified for the purpose described the combination with a vehicle wheel and a supporting axle therefor, an arm secured to the axle and provided with a sleeve, a clearer arranged in front of the wheel and in contact with the surface to remove objects therefrom in the path of the wheel, a main rod extending vertically from the clearer and passing through the sleeve of the before mentioned arm, a guide rod secured at its lower end to the clearer and extending upwardly parallel with the main rod and passing through the before mentioned arm, means connecting the upper ends of the two rods, and a spring interposed between the sleeve and clearer and yieldably holding the latter in engagement with the surface of the road.

2. In combination with a vehicle wheel and axle, a supporting arm connected with the axle and provided with a sleeve, a clearer arranged in advance of the vehicle wheel and in contact with the road surface, a main rod adjustably connected at its lower end with the clearer and passing through the sleeve of the supporting arm, guide rods at the sides of the main rod extending parallel therewith, one of said guide rods passing through an opening of the supporting arm, a cross piece connecting the upper ends of the main and guide rods, and an expansible helical spring mounted upon the lower portion of the main rod and confined between the lower end of the sleeve of the clearer.

In testimony whereof I affix my signature in presence of two witnesses.

ANGELO ✕ CARREIRO.
his / mark

Witnesses:
FRANCISCO DO REGO PEREIRA,
VICTORENE ROGERO.

---

Copies of this patent may be obtained for five cents each, by addressing the "Commissioner of Patents, Washington, D. C."